(12) United States Patent
Chun et al.

(10) Patent No.: US 9,350,502 B2
(45) Date of Patent: May 24, 2016

(54) METHOD AND APPARATUS FOR TRANSMITTING SYNCHRONIZATION SIGNAL IN WIRELESS COMMUNICATION SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 14/234,946

(22) PCT Filed: Jul. 27, 2012

(86) PCT No.: PCT/KR2012/006003
§ 371 (c)(1),
(2), (4) Date: Jan. 24, 2014

(87) PCT Pub. No.: WO2013/015646
PCT Pub. Date: Jan. 31, 2013

(65) Prior Publication Data
US 2014/0169327 A1   Jun. 19, 2014

Related U.S. Application Data

(60) Provisional application No. 61/511,988, filed on Jul. 27, 2011.

(51) Int. Cl.
*H04L 12/28* (2006.01)
*H04L 5/00* (2006.01)
(Continued)

(52) U.S. Cl.
CPC ........... *H04L 5/0007* (2013.01); *H04J 11/0073* (2013.01); *H04J 11/0076* (2013.01); *H04J 11/0079* (2013.01); *H04L 5/0032* (2013.01); *H04W 56/00* (2013.01);
(Continued)

(58) Field of Classification Search
USPC .................................. 370/252, 329, 350, 503
See application file for complete search history.

(56) References Cited

U.S. PATENT DOCUMENTS 6,064,340 A * 5/2000 Croft et al. .................... 342/460
2008/0273522 A1 * 11/2008 Luo et al. ...................... 370/350
(Continued)

OTHER PUBLICATIONS

3rd Generation Partnership Project Technical Specification Group, Technical Report: Downlink MIMO Enhancement for LTE-Advanced, Sep. 11, 2011, 3GPP, 3GPP TR 36.871 V1.0.10 (Release 11).*

(Continued)

*Primary Examiner* — John Pezzlo
(74) *Attorney, Agent, or Firm* — Lee, Hong, Degerman, Kang & Walmey; Jonathan Kang; Michael Monaco

(57) ABSTRACT

A method and an apparatus for transmitting data in a wireless communication system are provided. A base station transmits to a terminal a physical downlink control channel (PDCCH) through a macro node, and transmits a physical downlink shared channel (PDSCH) through at least one radio remote head (RRH) having a cell identity (ID) that is identical to the macro node, so as not to overlap in with the PDCCH in a time domain. A time gap can be set between a last orthogonal frequency division multiplexing (OFDM) symbol to which the PDCCH is allocated and a first OFDM symbol to which the PDSCH is allocated.

12 Claims, 13 Drawing Sheets

(51) Int. Cl.
*H04W 56/00* (2009.01)
*H04W 88/08* (2009.01)
*H04J 11/00* (2006.01)
*H04J 1/16* (2006.01)

(52) U.S. Cl.
CPC ....... *H04W 56/001* (2013.01); *H04W 56/0015* (2013.01); *H04W 88/085* (2013.01)

(56) References Cited

U.S. PATENT DOCUMENTS

| | | | |
|---|---|---|---|
| 2010/0087227 A1* | 4/2010 | Francos et al. | 455/562.1 |
| 2010/0202384 A1* | 8/2010 | Baker et al. | 370/329 |
| 2010/0232337 A1* | 9/2010 | Das et al. | 370/312 |
| 2010/0232373 A1* | 9/2010 | Nory et al. | 370/329 |
| 2011/0039558 A1* | 2/2011 | Lee et al. | 455/434 |
| 2011/0096680 A1* | 4/2011 | Lindoff et al. | 370/252 |
| 2011/0158081 A1* | 6/2011 | Wang et al. | 370/201 |
| 2011/0317780 A1* | 12/2011 | Kang | H04L 5/0007 375/260 |
| 2012/0120891 A1* | 5/2012 | Mazzarese et al. | 370/329 |
| 2012/0213109 A1* | 8/2012 | Xu et al. | 370/252 |
| 2013/0023285 A1* | 1/2013 | Markhovsky et al. | 455/456.1 |
| 2013/0286965 A1* | 10/2013 | Xu et al. | 370/329 |

OTHER PUBLICATIONS

Qualcomm Incorporated, "Comparison of CoMP Scenarios 3 and 4," 3GPP TSG-RAN WG1 #65, R1-111686, May 2011, 8 pages.
Research in Motion, "PDCCH Enhancement Considerations," 3GPP TSG RAN WG1 Meeting #65, R1-111661, May 2011, 4 pages.
Intel Corporation, "CSI-RS configuration/reconfiguration in distributed RRH systems," 3GPP TSG RAN WG1 Meeting #65, R1-111593, May 2011, 3 pages.
Research In Motion, Downlink CSI Feedback for Low-Power Nodes, 3GPP TSG RAN WG1 Meeting #65, R1-111662, May 2011, 6 pages.
NTT Docomo, "CoMP with Lower Tx Power RRH in Heterogeneous Network," 3GPP TSG-RAN WG1 #64, R1-110867, Feb. 2011, 8 pages.
Korean Intellectual Property Office Application Serial No. 10-2014-7001674, Office Action dated Dec. 16, 2014, 4 pages.

* cited by examiner

METHOD AND APPARATUS FOR TRANSMITTING SYNCHRONIZATION SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2012/006003, filed on Jul. 27, 2012, which claims the benefit of U.S. Provisional Application Ser. No. 61/511,988, filed on Jul. 27, 2011, the contents of which are all hereby incorporated by reference herein in their entirety.

BACKGROUND OF THE INVENTION

1. Field of the Invention

The present invention relates to wireless communications, more particularly, to a method and apparatus for transmitting a synchronization signal in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS.

The base station may transmit a synchronization signal to the user equipment, and the user equipment may synchronize time and frequency based on the received synchronization signal. In the distributed multi-node system, multiple nodes may transmit the synchronization signal. It is necessary that the user equipment synchronizes based on the synchronization signal of the node which serves the user equipment among the synchronization signals transmitted by the multiple nodes.

Accordingly, a method in which the user equipment performs synchronization effectively in the distributed multi-node system is required.

SUMMARY OF THE INVENTION

The present invention provides a method and apparatus for transmitting a synchronization signal in a wireless communication system. The present invention defines a new synchronization signal transmitted by a radio remote head (RRH) in a distributed multi-node system. In addition, the present invention provides a method for synchronizing, by a user equipment, time and frequency based on a newly defined synchronization signal.

In an aspect, a method for transmitting, by a base station, data in a wireless communication system is provided. The method includes transmitting a physical downlink control channel (PDCCH) to a user equipment through a macro node, and transmitting a physical downlink shared channel (PDSCH), so as not to overlap with the PDCCH in time domain, to the user equipment through at least one radio remote head (RRH) having a cell identity (ID) that is identical to that of the macro node.

The method may further include setting a time gap between a last orthogonal frequency division multiplexing (OFDM) symbol to which the PDCCH is allocated and a first OFDM symbol to which the PDSCH is allocated.

The method may further include transmitting information on the time gap to the user equipment.

The information on the time gap may be transmitted in a cell-specific manner or a user equipment specific manner.

The information on the time gap may be transmitted through an enhanced physical downlink control channel (e-PDCCH) allocated in a data region.

The method may further include receiving an indicator, which indicates that a time when the user equipment is synchronized with the macro node is later than a time when the user equipment is synchronized with the at least one RRH, from the user equipment.

The method may further include transmitting a primary synchronization signal (PSS) and a secondary synchronization signal (SSS) to the user equipment through the macro node.

The method may further include transmitting a third synchronization signal (TSS) to the user equipment through the at least one RRH.

In another aspect, a method for receiving, by a user equipment, data in a wireless communication system is provided. The method includes performing synchronization with a macro node based on at least one of a primary synchronization signal (PSS) and a secondary synchronization signal (SSS), performing synchronization with at least one radio remote head (RRH), having a cell identity (ID) that is identical to that of the macro node, based on a third synchronization signal (TSS), receiving a physical downlink control channel (PDCCH) through the macro node, and receiving a physical downlink shared channel (PDSCH), which does not overlap with the PDCCH in time domain, through the at least one RRH.

The method may further include decoding the received PDCCH and the received PDSCH.

A user equipment can perform synchronization with an RRH in time and frequency in a distributed multi-node system.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
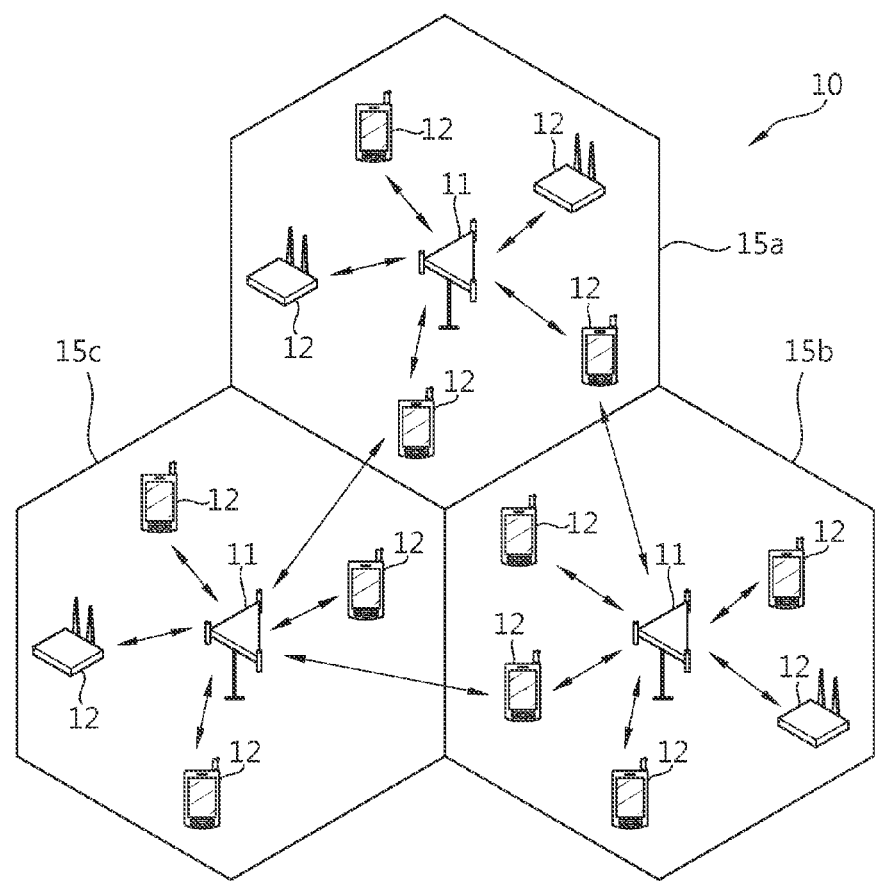
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
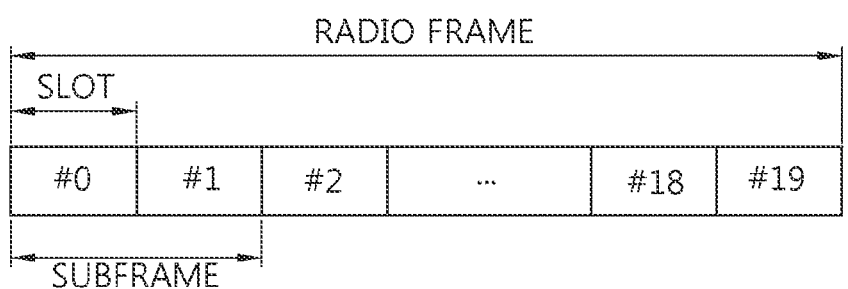
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
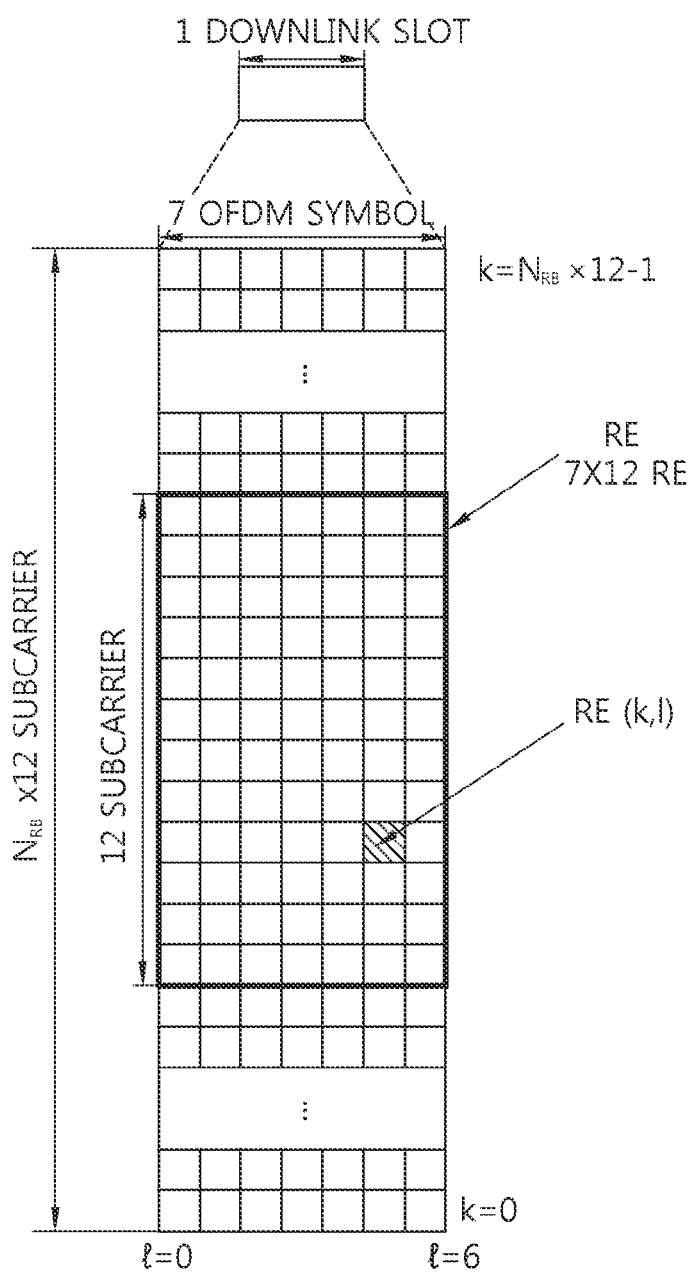
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , NRB×12-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
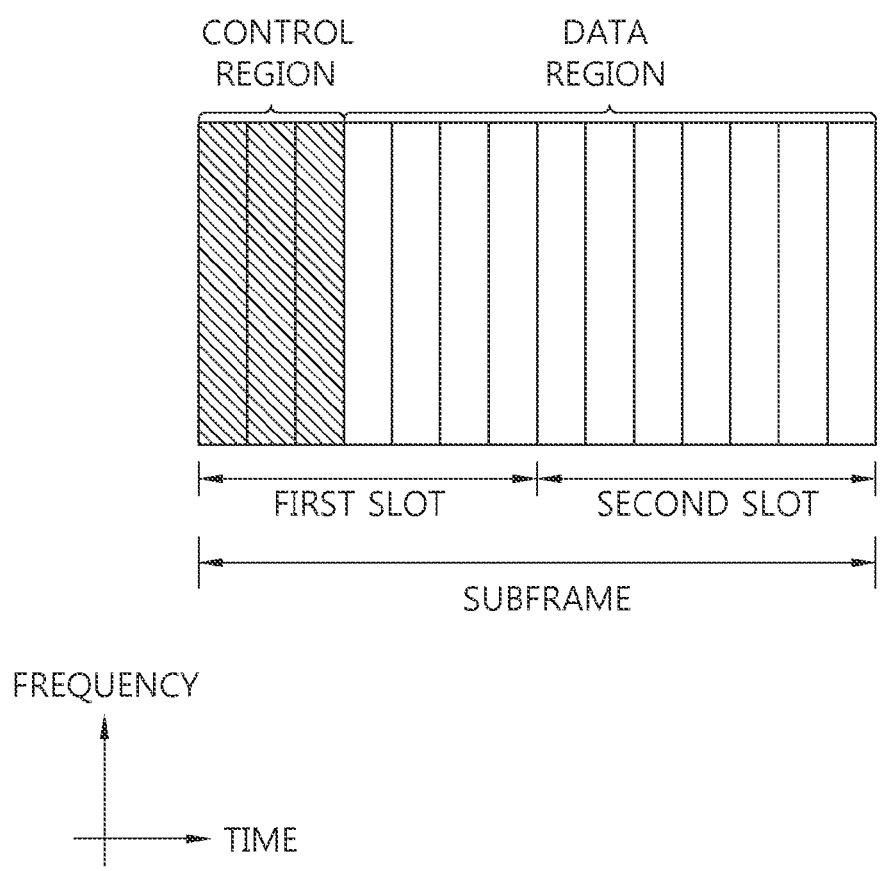
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to downlink control information (DCI) to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
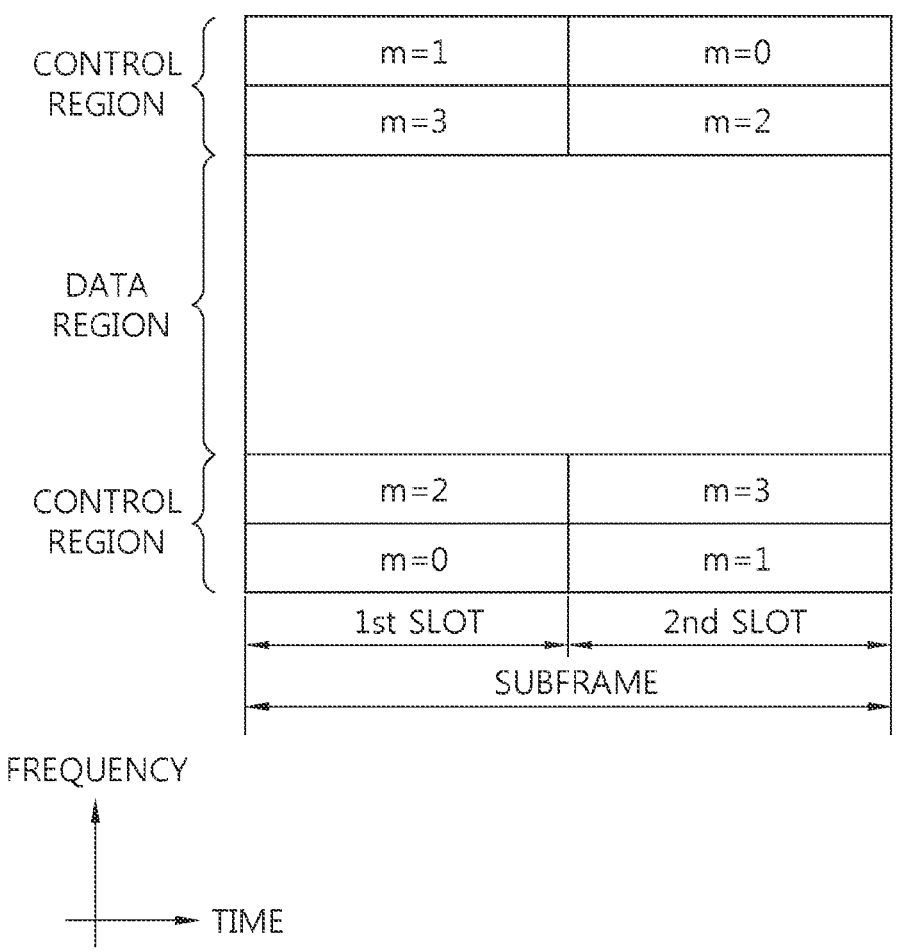
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
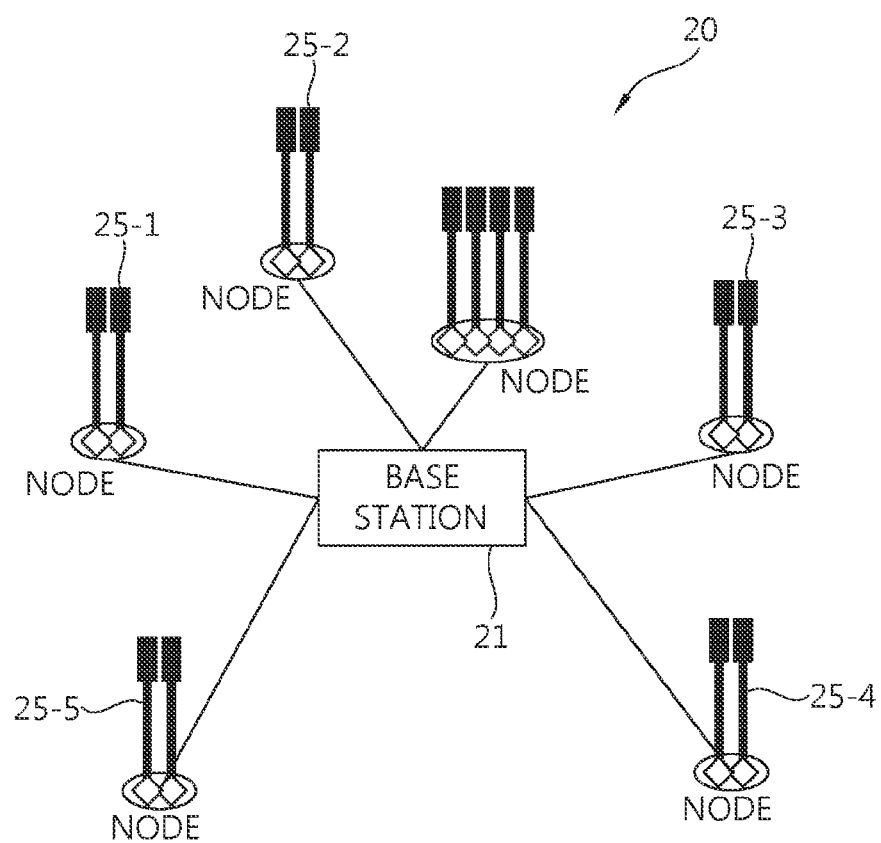
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

The UE may synchronize time and frequency with the base station based on the synchronization signal received from the base station. The synchronization signal of 3GPP LTE-A includes a primary synchronization signal (PSS) and a secondary synchronization signal (SSS). The synchronization signal of 3GPP LTE-A may refer to Section 6.11 of 3GPP TS 36.211 V10.2.0 (2011-06).

Figure 7:
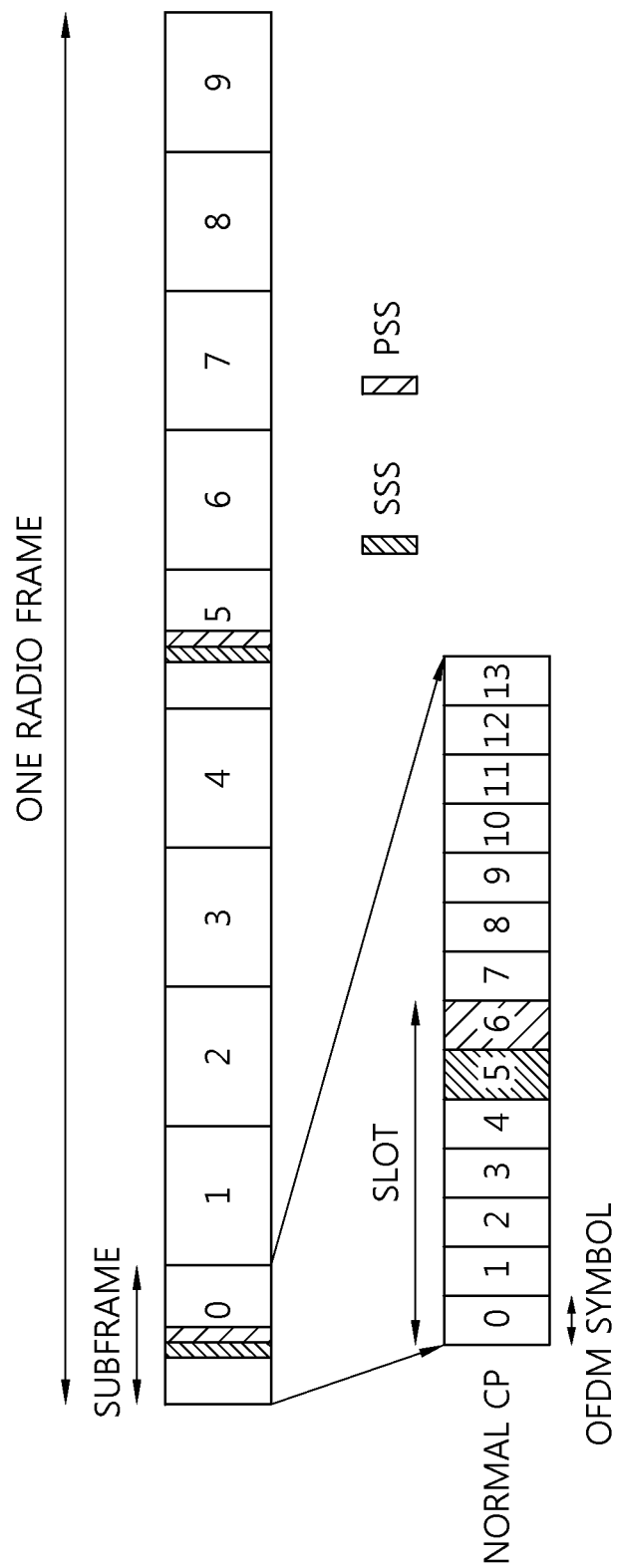
FIG. 7 shows an example of a radio frame in which a synchronization signal is transmitted.

FIG. 7 shows an example of a radio frame in which a synchronization signal is transmitted.

FIG. 7 shows a case of which the synchronization signal is transmitted in the FDD radio frame. Referring to FIG. 7, the PSS is mapped to the last OFDM symbols of the first slot (the slot '0') and the eleventh slot (the slot '10') within the radio frame. The SSS is mapped to the second OFDM symbols from the last of the first slot and the eleventh slot within the radio frame.

The PSS is used to obtain the synchronization of the OFDM symbol or the synchronization of the slot, and is related to a physical-layer cell identify (PCI). The sequence used for the PSS may be generated from the frequency domain Zadoff-Chu (ZC) sequence. It is assumed that the PSS is not transmitted on the antenna port on which the downlink reference signal (RS) is transmitted.

Figure 8:
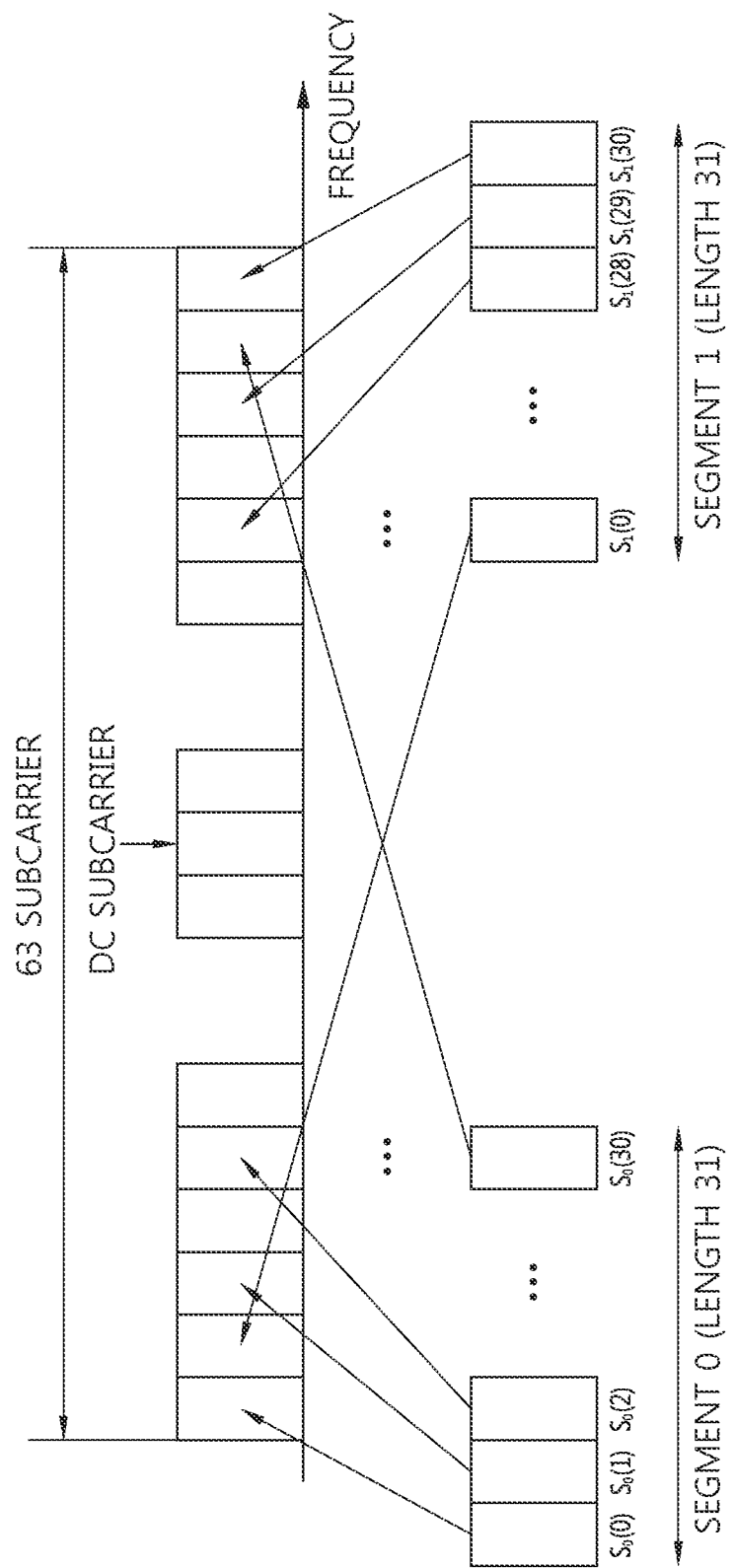
FIG. 8 shows an example of a configuration of an SSS.

FIG. 8 shows an example of a configuration of an SSS.

The SSS is used to obtain the synchronization of the frame. The sequence used for the SSS is the interleaved concatenation of the two binary sequences whose length is 31. Referring to FIG. 8, the segment 0 whose length is 31 may be represented by $S_0(0), \ldots, S_0(30)$, and the segment 1 whose length is 31 may be represented by $S_1(0), \ldots, S_1(30)$. The segment 0 and the segment 1 are mapped to 62 subcarriers except the direct current (DC) subcarriers among 63 subcarriers. Each of the segment 0 and the segment 1 are mapped to 62 subcarriers alternately. That is, the segment 0 and the segment 1 are mapped to the frequency domain in the order of $S_0(0), S_1(0), S_0(1), S_1(1), \ldots, S_0(30), S_1(30)$. The concatenated sequence may be scrambled to the scrambling sequence given by the PSS. The two sequences defining the SSS are different from each other in the first subframe (subframe 0) and the sixth subframe (subframe 5).

Hereinafter, a proposed method for transmitting a synchronization signal is described.

Figure 9:
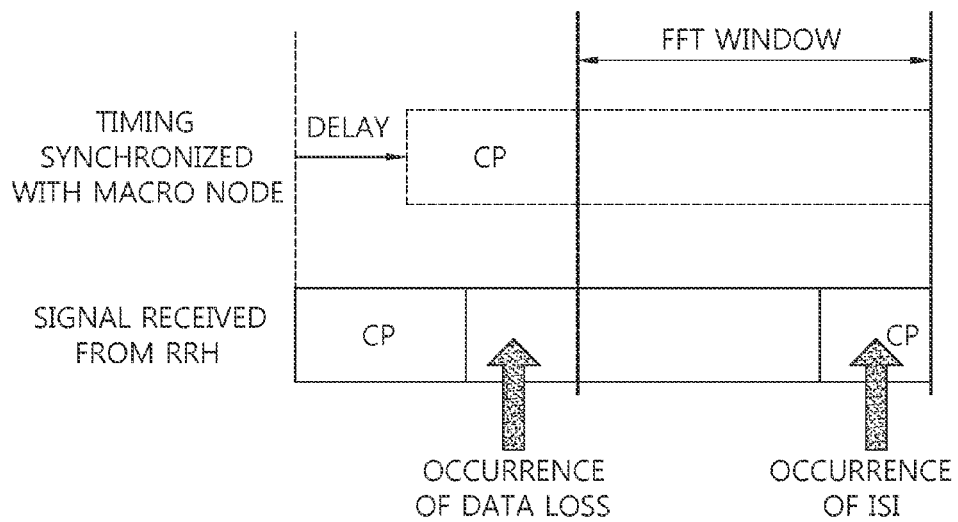
FIG. 9 shows an example of a case that an error occurs on time synchronization.

FIG. 9 shows an example of a case that an error occurs on time synchronization.

In the distributed multi-node system, the multiple nodes including the macro node may utilize the same cell ID. In this case, the macro node only may transmit the synchronization signal including the PSS and the SSS or the macro node and the multiple RRH may transmit the same synchronization signals with time-aligned manner. In addition, it may be assumed that the UE is served by one RRH, not by the macro node. Accordingly, the situation in which the time is synchronized with the macro node while the UE is served by one RRH, not by the macro node, may occur.

Referring to FIG. 9, the time synchronized with the macro node is slower than the time of the data signal received by the RRH. That is, the UE is served by the RRH which is closer than the macro node. Although the UE is served by the RRH, the fast Fourier transform (FFT) window is configured by the time synchronized with the macro node. Accordingly, the UE receives the PDSCH from the RRH while the time synchronization is broken. Since the UE may detect only a few OFDM symbols through the FFT window among the OFDM symbols received from the RRH, the performance of the PDSCH may be deteriorated, and the next OFDM symbol may act as an inter-symbol interference (ISI) against the current OFDM symbol. In addition, the synchronization for the frequency offset is required, which occurs by the differences between the oscillator of the macro node and the oscillator of the RRH.

Accordingly, the present invention proposes a new synchronization signal which the RRH separately transmits, in addition to the existing PSS/SSS.

Figure 10:
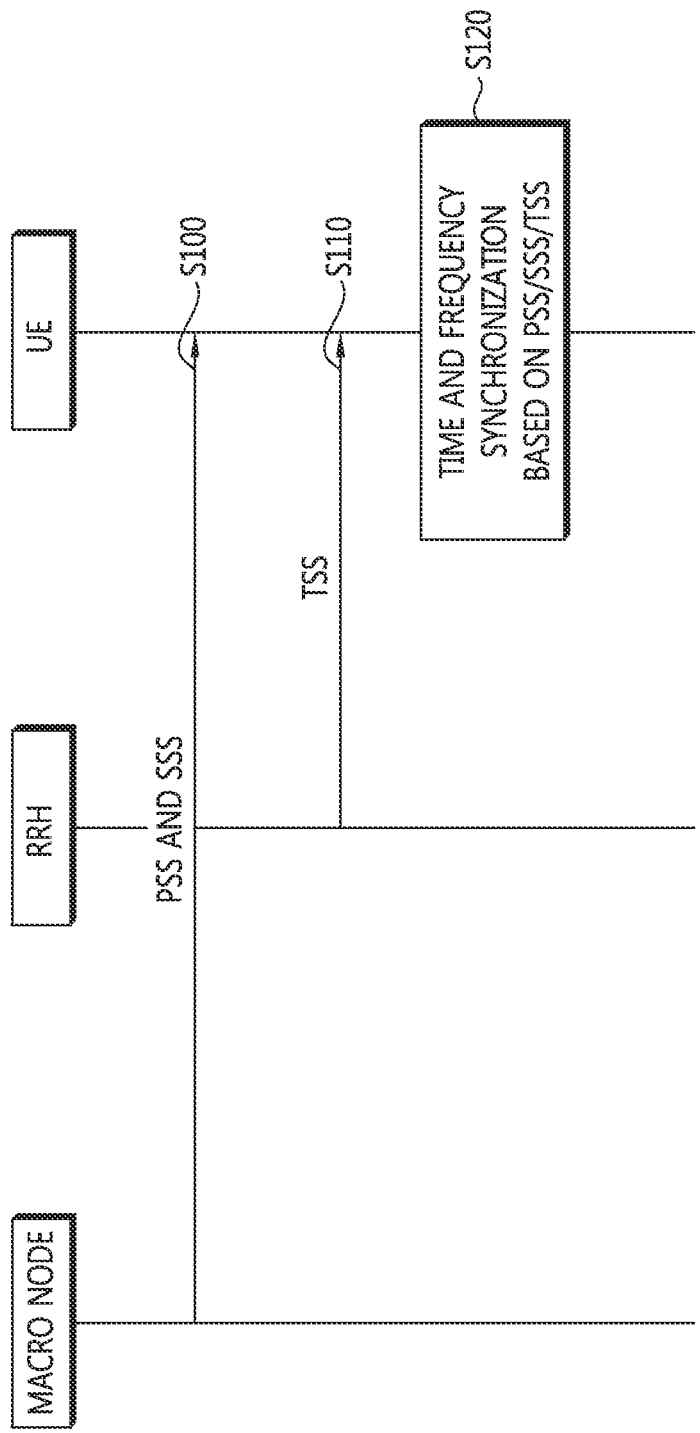
FIG. 10 shows an embodiment of a proposed method for transmitting a synchronization signal.

FIG. 10 shows an embodiment of a proposed method for transmitting a synchronization signal.

In step S100, the macro node transmits the PSS and the SSS to the UE. In step S110, at least one RRH transmits a third synchronization signal (TSS) to the UE. In step S120, the UE performs synchronization based on the received PSS, the SSS and the TSS.

The TSS transmitted by the RRH, not by the macro node, may be newly defined. The information on a location in the subframe in which the TSS transmitted, the information on a period of the transmission of the TSS, and the information on the generation of the TSS sequence may be predefined or signaled to the UE through the higher layer. Or, the TSS may use the same structure and sequence as those of the existing PSS or SSS as it is, only a few parameters of the TSS may be signaled to the UE through the higher layer. For example, the TSS may use the same structure of the SSS, and the TSS sequence may be generated by using the parameters which are received through the higher layer except the parameters such as $N_{ID}^{(1)}$, $N_{ID}^{(2)}$ which are obtained after the demodulation of the PSS. Or, when each RRH uses different channel state information (CSI) RS antenna port numbers or different CSI RS configurations, the TSS sequence may be generated by using the combination of $N_{ID}^{(1)}$, $N_{ID}^{(2)}$ and the CSI RS antenna port number or the CSI RS configuration, rather than using the $N_{ID}^{(1)}$, $N_{ID}^{(2)}$. The TSS sequence may be a part of the SSS sequence. The base station may instruct to the UE whether the TSS is transmitted through the RRH or not. The UE is instructed it from the base station, and may obtain the identity (ID) of the TSS by detecting the TSS sequence. Or, the UE may perform the synchronization with the base station by receiving the ID of the TSS from the base station. The ID of the TSS obtained as such is used as an initial value to generate a pseudo random sequence of the DL or the UL with the $N_{ID}^{cell}$ or instead of $N_{ID}^{cell}$.

According to the embodiment of the present invention, the UE may perform the synchronization of time and frequency based on at least one TSS transmitted by each RRH of the distributed multi-node system, as well as based on the existing PSS and SSS. That is, the UE may perform the synchronization of time and/or frequency based on a plurality of references. If the time synchronization based on the PSS and/or the SSS is different from the time synchronization based on the TSS, the UE may notify it to the base station.

Figure 11:
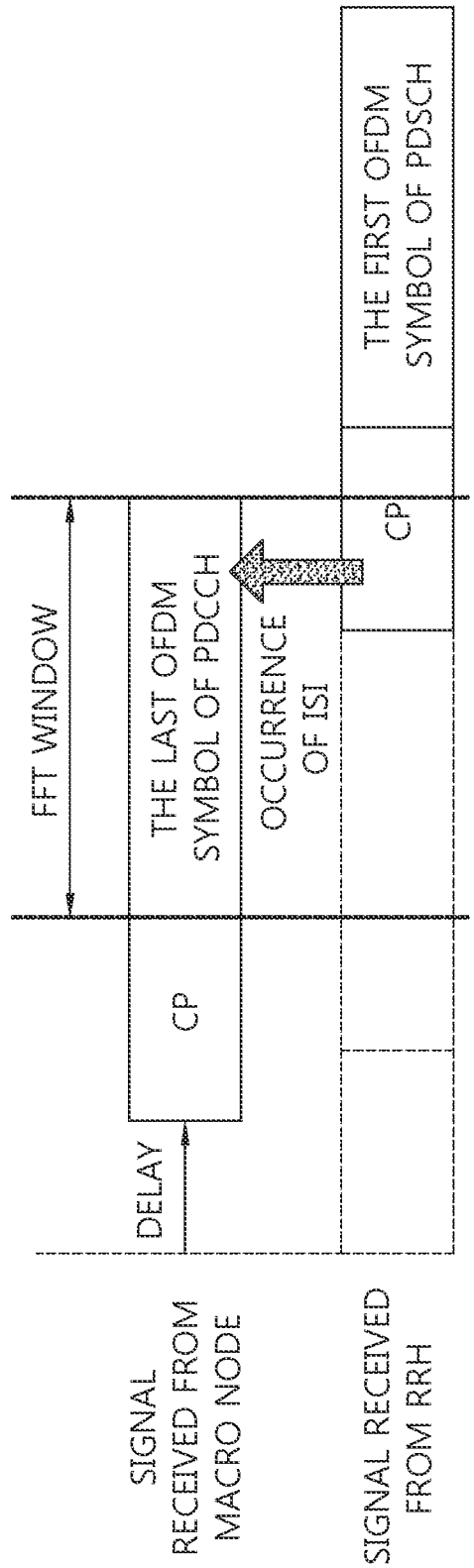
FIG. 11 shows another example of a case that an error occurs on time synchronization.

FIG. 11 shows another example of a case that an error occurs on time synchronization.

The base station transmits control channels such as a physical control format indicator channel (PCFICH), the PDCCH and a physical HARQ indicator channel (PHCIH) through the macro node. In addition, the base station transmits the PDSCH through at least one of the RRH. The UE may detect the control channel such as the PDCCH and the like transmitted through the macro node by the time synchronized based on the PSS and/or the SSS. In addition, the UE may detect the PDSCH transmitted through at least one of the RRH by the time synchronized based on the TSS. In this case, the first OFDM symbol to which the PDSCH is allocated may act as interference against the last OFDM symbol to which the control channel is allocated. Referring to FIG. 11, in the state of the time synchronized based on the PSS and/or the SSS in order to detect the PDCCH, the first OFDM symbol to which the PDSCH is allocated, which is received from the RRH, may act as interference against the last OFDM symbol to which the PDCCH symbol is allocated. Accordingly, the performance of detecting the PDCCH may be deteriorated.

Figure 12:
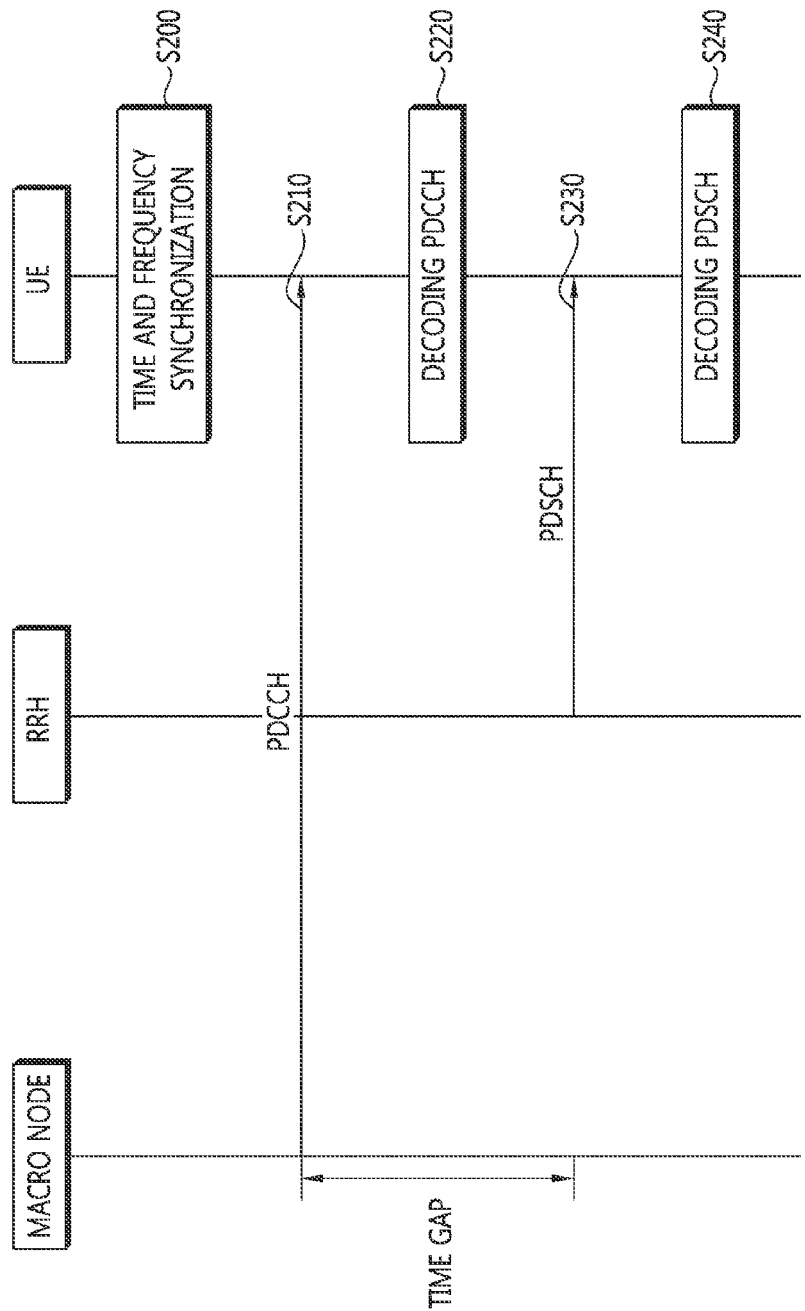
FIG. 12 shows an embodiment of a proposed method for transmitting data.

FIG. 12 shows an embodiment of a proposed method for transmitting data.

Referring to FIG. 12, the UE performs the time and frequency synchronization based on at least one of the PSS, the SSS and the TSS. In this case, the UE may perform the synchronization with the macro node based on the PSS and/or the SSS, and may perform the synchronization with at least one RRH based on the TSS. When the time which is synchronized based on the PSS and/or the SSS is slower than the time synchronized based on the TSS, the UE may notify it to the base station.

In step S210, the base station transmits the PDCCH through the macro node. In step S220, the UE decodes the PDCCH.

In step S230, the base station transmits the PDSCH through at least one RRH to the UE. In this time, the base station may set up the time gap between the PDCCH and the PDSCH in order to prevent interference against the last OFDM symbol transmitted from the macro node. That is, the base station may set back the first OFDM symbol of the PDSCH as much as the time gap. The information for the time gap may be transmitted to the UE in a cell-specific or a UE-specific manner. In addition, the information for the time gap may be transmitted to the UE through an enhanced physical downlink channel (e-PDCCH) which is the control channel newly defined for the distributed multi-node system. The e-PDCCH may be allocated within the data region.

In step S240, the UE decodes the PDSCH. According to the proposed method for transmitting data, the first OFDM symbol of the PDSCH does not act as interference with the last OFDM symbol of the PDCCH.

Figure 13:
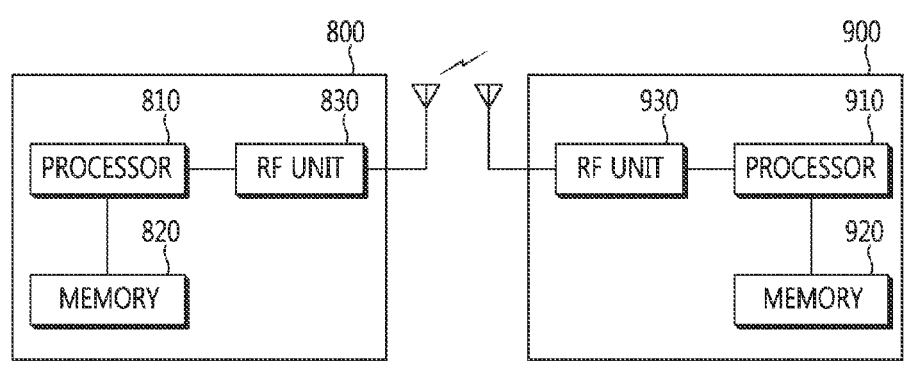
FIG. 13 is a block diagram showing wireless communication system to implement an embodiment of the present invention.

FIG. 13 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposes of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for transmitting, by a base station, data in a wireless communication system, the method comprising:
    transmitting a primary synchronization signal (PSS) and a secondary synchronization signal (SSS) to a user equipment through a macro node,
    wherein a synchronization with the macro mode is performed based on at least one of the primary synchronization signal (PSS) and the secondary synchronization signal (SSS);
    transmitting a physical downlink control channel (PDCCH) to the user equipment through the macro node;
    setting a time gap between a last orthogonal frequency division multiplexing (OFDM) symbol to which the PDCCH is allocated and a first OFDM symbol to which the PDSCH is allocated;
    transmitting a third synchronization signal (TSS) to the user equipment through at least one radio remote head (RRH),
    wherein a synchronization with the at least one radio remote head (RRH) is performed based on the third synchronization signal (TSS),
    wherein information related to the TSS is transmitted to the user equipment through a higher layer,
    wherein the information related to the TSS includes information indicating a transmission location of the TSS, a transmission period of the TSS, and a generation of a sequence of the TSS,
    wherein a part of sequence of the SSS is used to represent the sequence of the TSS, and an identity of the TSS is obtained by detecting the sequence of the TSS, and
    wherein the obtained identity of the TSS is used as an initial value to generate a downlink/uplink pseudo random sequence; and
    transmitting a physical downlink shared channel (PDSCH) to the user equipment through the at least one radio remote head (RRH) having a cell identity (ID) that is identical to that of the macro node,
    wherein the transmitted PDSCH is not overlapped with the transmitted PDCCH in a time domain.

2. The method of claim 1, further comprising:
    transmitting information on the time gap to the user equipment.

3. The method of claim 2, wherein the information on the time gap is transmitted in a cell-specific manner or a user equipment specific manner.

4. The method of claim 2, wherein the information on the time gap is transmitted through an enhanced physical downlink control channel (e-PDCCH) allocated in a data region.

5. The method of claim 1, further comprising:
    receiving an indicator, which indicates that a time when the user equipment is synchronized with the macro node is later than a time when the user equipment is synchronized with the at least one RRH, from the user equipment.

6. A method for receiving, by a user equipment, data in a wireless communication system, the method comprising:
    performing synchronization with a macro node based on at least one of a primary synchronization signal (PSS) and a secondary synchronization signal (SSS);
    performing synchronization with at least one radio remote head (RRH), having a cell identity (ID) that is identical to that of the macro node, based on a third synchronization signal (TSS),
    wherein information related to the TSS is received by the user equipment through a higher layer,
    wherein the information related to the TSS includes information indicating a transmission location of the TSS, a transmission period of the TSS, and a generation of a sequence of the TSS,
    wherein a part of sequence of the SSS is used to represent the sequence of the TSS, and an identity of the TSS is obtained by detecting the sequence of the TSS, and
    wherein the obtained identity of the TSS is used as an initial value to generate a downlink/uplink pseudo random sequence;
    receiving a physical downlink control channel (PDCCH) through the macro node; and
    receiving a physical downlink shared channel (PDSCH), which does not overlap with the PDCCH in time domain, through the at least one RRH,
    wherein a time gap is set between a last orthogonal frequency division multiplexing (OFDM) symbol to which the PDCCH is allocated and a first OFDM symbol to which the PDSCH is allocated.

7. The method of claim 6, further comprising:
    transmitting an indicator, which indicates that a time synchronized with the macro node is later than a time synchronized with the at least one RRH, to a base station.

8. The method of claim 6, further comprising:
    receiving information on the time gap from a base station.

9. The method of claim 8, wherein the information on the time gap is received in a cell-specific manner or a user equipment specific manner.

10. The method of claim 8, wherein the information on the time gap is received through an enhanced physical downlink control channel (e-PDCCH) allocated in a data region.

11. The method of claim 6, further comprising:
    decoding the received PDCCH and the received PDSCH.

12. A user equipment configured to receive data in a wireless communication system, the user equipment comprising:
    a memory;
    a transmit and receive device; and
    a processor operatively connected to the memory and to the transmit and receive device, the processor configured to:
        perform synchronization with a macro node based on at least one of a primary synchronization signal (PSS) and a secondary synchronization signal (SSS);
        perform synchronization with at least one radio remote head (RRH), having a cell identity (ID) that is identical to that of the macro node, based on a third synchronization signal (TSS), wherein information related to the TSS is received by the user equipment through a higher layer, wherein the information related to the TSS includes information indicating a transmission location of the TSS, a transmission period of the TSS, and a generation of a sequence of the TSS, wherein a part of sequence of the SSS is used to represent the sequence of the TSS, and an identity of the TSS is obtained by detecting the sequence of the TSS, and wherein the obtained identity of the TSS is used as an initial value to generate a downlink/uplink pseudo random sequence;

receive a physical downlink control channel (PDCCH) through the macro node; and receive a physical downlink shared channel (PDSCH), which does not overlap with the PDCCH in time domain, through the at least one RRH, wherein a time gap is set between a last orthogonal frequency division multiplexing (OFDM) symbol to which the PDCCH is allocated and a first OFDM symbol to which the PDSCH is allocated.

* * * * *